No. 863,660. PATENTED AUG. 20, 1907.
W. A. SCHLEICHER.
FIFTH WHEEL.
APPLICATION FILED NOV. 7, 1906.
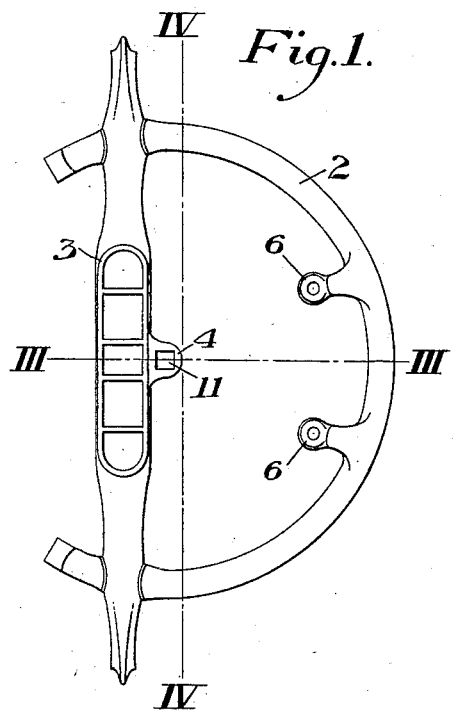
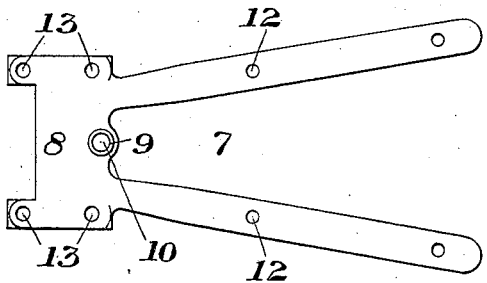
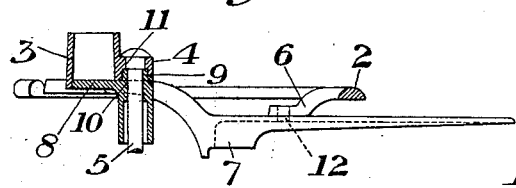
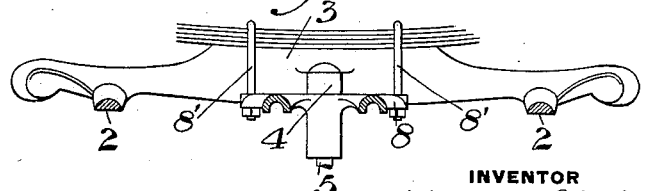
WITNESSES
W. W. Swartz
R. A. Balderson
INVENTOR
William A. Schleicher
by Bakewell & Byrnes,
his Attys.
THE NORRIS PETERS CO., WASHINGTON, D. C.

UNITED STATES PATENT OFFICE.

WILLIAM A. SCHLEICHER, OF CLEVELAND, OHIO.

FIFTH-WHEEL.

No. 863,660.

Specification of Letters Patent.

Patented Aug. 20, 1907.

Application filed November 7, 1906. Serial No. 342,329.

*To all whom it may concern:*

Be it known that I, WILLIAM A. SCHLEICHER, of Cleveland, Cuyahoga county, Ohio, have invented a new and useful Fifth-Wheel, of which the following is a full, clear, and exact description, reference being had to the accompanying drawings, forming part of this specification, in which—

Figure 1 is a top plan view of the upper circle plate and head block with the perch irons detached; Fig. 2 is a similar view of the perch irons; Fig. 3 is a section on the line III—III of Fig. 1 with the perch irons attached to the circle-plate and head-block; and Fig. 4 is a transverse section on the line IV—IV of Fig. 1 with the parts attached.

The object of my invention is to provide a fifth wheel construction of strong and durable character, in which the perch iron is made integral with the clip seat, and is arranged to be secured to the head-block and to the upper circle plate in the novel manner hereinafter described, thereby facilitating the assembling of the parts, and also enabling them to be finished separately in their respective departments, and finally assembled at a minimum of labor and expense.

With this object in view, my invention consists in the novel construction, arrangement and combination of parts all substantially as hereinafter described and pointed out in the appended claims.

In the drawings, the numeral 2 designates the upper circle plate of a fifth wheel, 3 is the head-block, which is cast integral with the circle plate, and which is formed with a rearwardly projecting lug 4, which, in the construction shown, is designed to receive a king-bolt 5 in the rear of the head-block.

6 indicates inwardly projecting depending lugs, which are formed integral with the upper circle plate 2. 7 designates the perch iron, which is formed with the integral clip seat 8 and socket 9 having a hole 10 which registers with a hole 11 in the lug 4 to receive the king-bolt.

In assembling the parts, the inwardly extending depending lugs 6 are secured to the perch irons at the points 12, as indicated in Fig. 3; and the clip seat 8 is attached to the head-block by vertical connections 8' passing through the perforations 13 of said seat.

It will be readily seen that the construction is a simple one, which enables the parts to be finished separately in their respective departments and quickly assembled, the construction at the same time presenting a maximum strength.

Although I have shown the king-bolt as being arranged at the rear of the head-block 3, it may be at the center of such block or in front of the same, as may be desired, and the parts may be modified in various ways in order to adapt them to vehicles and fifth wheels of various types.

What I claim is:—

1. A fifth wheel construction having an integral fifth wheel plate and head-block, a clip seat perforated to receive the king bolt, and adapted to be attached to the under side of the head-block by vertical connections, and a perch iron integral with the clip seat; substantially as described.

2. The herein described fifth wheel construction, having a fifth wheel plate and head-block formed integral with each other, a separate clip seat adapted to be attached to the under side of the head-block by vertical connections, and a perch iron integral with the clip seat; substantially as described.

3. The herein described fifth wheel construction, having an integral fifth wheel plate and head block, said plate having inwardly projecting lugs depending from the inner segment of the plate at the rear of the king-bolt, and a separate perch iron having an integral clip seat, the latter being perforated to receive the king-bolt and adapted for attachment to the under side of the head-block; substantially as described.

4. The herein described fifth wheel construction, consisting of an integral upper circle plate and head-block, said plate having inwardly projecting lugs dependent therefrom in the rear of the king-bolt, and a separate perch iron formed with an integral clip seat and adapted to be secured to the under side of the head-block, said iron having means for its attachment to the depending lugs; substantially as described.

In testimony whereof, I have hereunto set my hand.

WILLIAM A. SCHLEICHER.

Witnesses:
 RUSSELL JAITE,
 EMIL W. JAITE.